United States Patent
Di Tota

(10) Patent No.: US 12,024,275 B2
(45) Date of Patent: Jul. 2, 2024

(54) CARGO DOOR WITH FAIL-SAFE MECHANISM

(71) Applicant: LEONARDO S.P.A., Rome (IT)

(72) Inventor: Antonello Di Tota, Pomigliano d'Arco (IT)

(73) Assignee: LEONARDO S.P.A, Rome (IT)

( * ) Notice: Subject to any disclaimer, the term of this patent is extended or adjusted under 35 U.S.C. 154(b) by 163 days.

(21) Appl. No.: 17/800,356

(22) PCT Filed: Feb. 19, 2021

(86) PCT No.: PCT/IB2021/051415
§ 371 (c)(1),
(2) Date: Aug. 17, 2022

(87) PCT Pub. No.: WO2021/165896
PCT Pub. Date: Aug. 26, 2021

(65) Prior Publication Data
US 2023/0073730 A1 Mar. 9, 2023

(30) Foreign Application Priority Data
Feb. 21, 2020 (IT) ........................ 202020000000851

(51) Int. Cl.
*B64C 1/14* (2006.01)
*B64C 1/00* (2006.01)
(Continued)

(52) U.S. Cl.
CPC ............ *B64C 1/1415* (2013.01); *E05C 9/006* (2013.01); *E05C 9/08* (2013.01); *B64C 2001/009* (2013.01)

(58) Field of Classification Search
CPC ....... B64C 1/14; B64C 1/1407; B64C 1/1415; B64C 1/1423; B64C 1/1461;
(Continued)

(56) References Cited

U.S. PATENT DOCUMENTS

| 4,497,462 A | 2/1985 | Hamatani |
| 2020/0207453 A1* | 7/2020 | di Tota .................. B64C 1/1415 |

FOREIGN PATENT DOCUMENTS

| CN | 103600834 A | 2/2014 |
| EP | 0743240 A2 | 11/1996 |

(Continued)

OTHER PUBLICATIONS

International Search Report, issued in PCT/IB2021/051415, mailed Jun. 4, 2021, Rijswijk, NL.

*Primary Examiner* — Joshua J Michener
*Assistant Examiner* — Colin Zohoor
(74) *Attorney, Agent, or Firm* — ArentFox Schiff LLP; Michael Fainberg

(57) ABSTRACT

A cargo door for an aircraft having a plurality of locking devices spaced near an edge of the cargo door, at least one vent panel, a control handle, and a torsion shaft actuating a plurality of pins to lock and unlock the plurality of locking devices is provided. A first drive connects the control handle to the torsion shaft to rotate the torsion shaft following a locking or unlocking command imparted to the control handle. A second drive connects the torsion shaft to the at least one vent panel to open or close the at least one vent panel following a rotation of the torsion shaft. The torsion shaft is a double shaft having two coaxial and rotationally integral shafts, namely an inner control shaft and an outer tubular control shaft.

7 Claims, 3 Drawing Sheets

(51) Int. Cl.
*E05C 9/00* (2006.01)
*E05C 9/08* (2006.01)

(58) Field of Classification Search
CPC ....... B64C 2001/009; E05C 1/06; E05C 9/08;
E05C 9/085; F16K 24/00; E05B 83/02;
E05B 83/08; E05B 83/10; E05B 83/12;
Y10T 292/1049
See application file for complete search history.

(56) References Cited

FOREIGN PATENT DOCUMENTS

| | | | |
|---|---|---|---|
| WO | 8401761 | A1 | 5/1984 |
| WO | 2009051875 | A2 | 4/2009 |

\* cited by examiner

CARGO DOOR WITH FAIL-SAFE MECHANISM

CROSS-REFERENCE TO RELATED APPLICATIONS

This application is a National Phase Application of PCT International Application No. PCT/IB2021/051415, having an International Filing Date of Feb. 19, 2021 which claims priority to Italian Application No. 202020000000851 filed Feb. 21, 2020, each of which is hereby incorporated by reference in its entirety.

FIELD OF THE INVENTION

The present invention relates to the cargo aircraft sector and refers to a cargo door with a fail-safe locking mechanism for locking the door in a closed condition.

BACKGROUND OF THE INVENTION

Commercial aircraft are usually equipped with a multiplicity of entry and exit openings at the bottom of the aircraft fuselage to allow loading and unloading of baggage, cargo and the like into and out of the hold, and doors suitable for closing such openings. Some cargo doors swing outwards; these doors are designed in such a way that the interior cabin of the aircraft may be pressurized only when the doors are fully and correctly closed and locked. For this purpose, one or more relatively small vent panels are made in the cargo door, with the operating mechanisms of the cargo door and the vent panel connected together in such a way that the closure of the vent panels is precluded if the cargo door is not completely and correctly closed and locked; thus, the pressurization of the internal compartments of the aircraft is prevented until every single door is closed, latched and locked.

The current Large Cargo Door fitted to cargo aircraft in use has a locking mechanism which is controlled by a vent panel controlled by the same shaft that actuates the closing/opening of the cargo door. If the cargo door locking and unlocking mechanism is defective, the vent panel will either not close or not open, depending on the condition of the panel at the time the mechanism fails. In this way, the presence of a fault is indicated.

Current cargo door locking mechanisms do not ensure verification under all conditions, including in the event that one of the components of the locking mechanism has failed.

A latch-lock mechanism for an airplane cargo door is disclosed in EP 0 743 240 A2.

SUMMARY OF THE INVENTION

In short, the present invention provides a locking mechanism equipped with a double drive shaft, the operation of which is ensured even in the presence of a failure of one of the shafts, capable of operating the vent panel by correctly signaling the locking of the latches. The two shafts are coaxial, whereby the size of the double shaft is the same as that of a single shaft. The inner shaft benefits from the protection of the outer shaft both with respect to aggressive chemicals and mechanical or thermal effects.

BRIEF DESCRIPTION OF THE FIGURES

An exemplary and preferential but non-limiting embodiment of the present invention will now be described, with reference to the appended drawings, in which

FIGS. 2A and 2B are enlarged views of two details of FIG. 2;

BRIEF DETAILED DESCRIPTION

Figure 1:
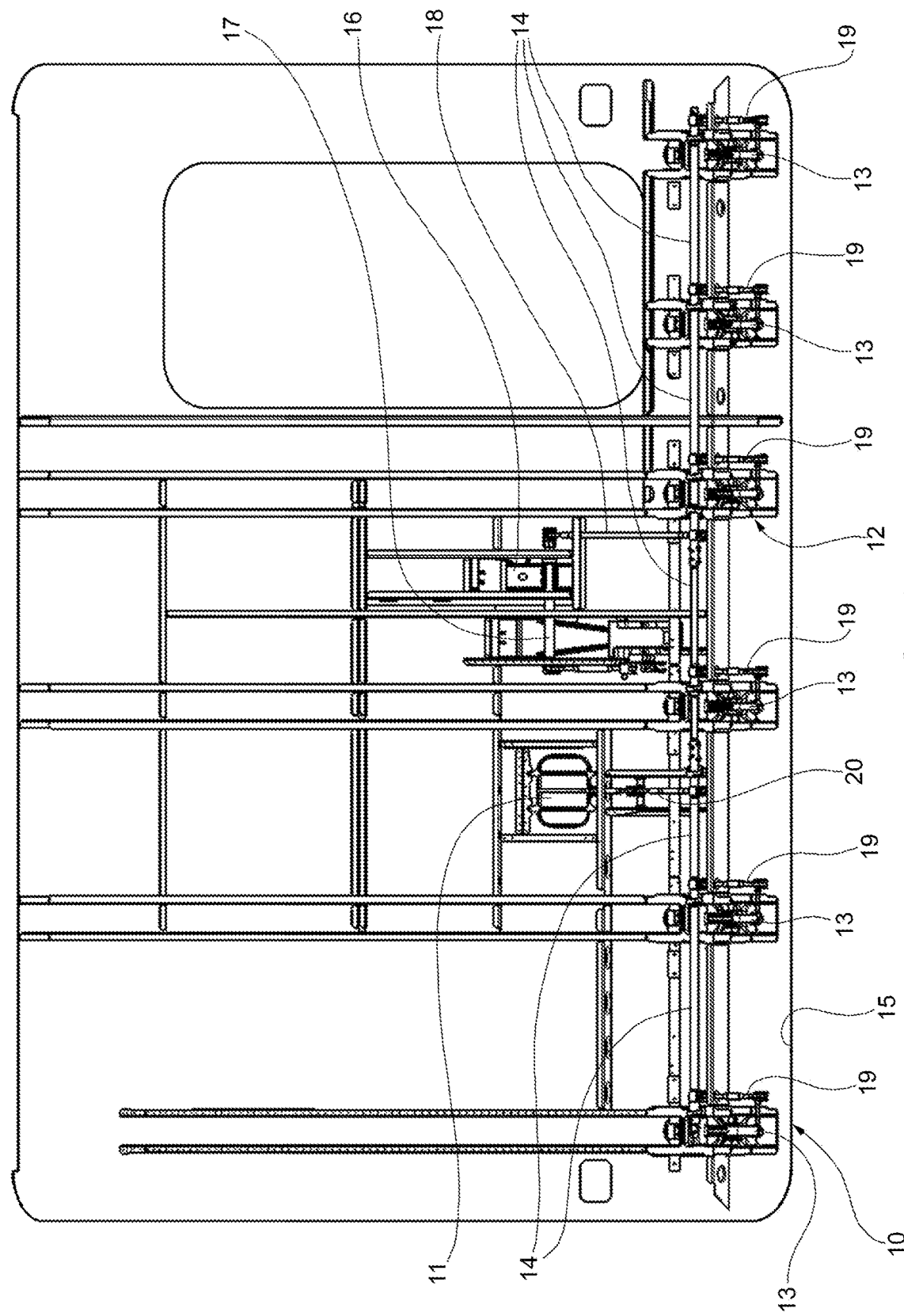
FIG. 1 is an inside view of a cargo door depicted in the closed position, where some parts have been removed for the sake of clarity, showing in particular those parts of the actuation mechanism used to lock/unlock the cargo door.

Referring initially to FIG. 1, a cargo door is indicated as a whole with the reference number 10. The illustrated cargo door is, in this example, an outward-opening swinging door adapted to be hinged to the body structure of an aircraft fuselage along a horizontal hinge axis extending along an upper edge of a compartment (not shown) formed in the fuselage and closable by said cargo door.

The cargo door 10 comprises one or more vent panels 11 (in the illustrated configuration only one is provided) to allow the inner compartments of the aircraft cabin to be pressurized during flight operations and, at the same time, to allow the internal pressure of the cabin and the external pressure to be equalized in preparation for opening the cargo door.

The cargo door is locked in a fully closed position by a locking mechanism indicated as a whole with 12, which includes a plurality of latch locking devices 13 mounted on the inner face of the cargo door. The locking devices 13 are horizontally spaced near a lower horizontal edge 15 of the cargo door. The locking mechanism 12 comprises a horizontal torsion shaft 14 extending near the lower horizontal edge 15 of the cargo door. The torsion shaft 14 serves to support and rotationally drive a plurality of actuation pins 19 which lock and unlock the locking devices 13.

The locking mechanism 12 comprises a manually operated control handle 16, known per se, which assumes a closed position flush with the outer surface of the fuselage skin. The torsion shaft 14 also serves to transmit a rotational torque a shaft 20 for opening and closing the vent panel 11.

The control handle 16 is attached to a control shaft 17 which, by means of a first drive 18, is coupled to the torsion shaft 14.

The torsion shaft 14 is a double "fail-safe" shaft, composed of two coaxial shafts 21, 22, mechanically connected at both ends, which ensure the transmission of motion from the control handle 16 towards each actuation pin 19, even if one of the two coaxial shafts loses integrity.

The double torsion shaft 14 comprises an inner or central control shaft 21 and an outer tubular control shaft 22.

The various locking devices 13, six in number in the example illustrated in FIG. 1, are distributed over a considerable distance, which requires an overall long torsion shaft 14.

Figure 2:
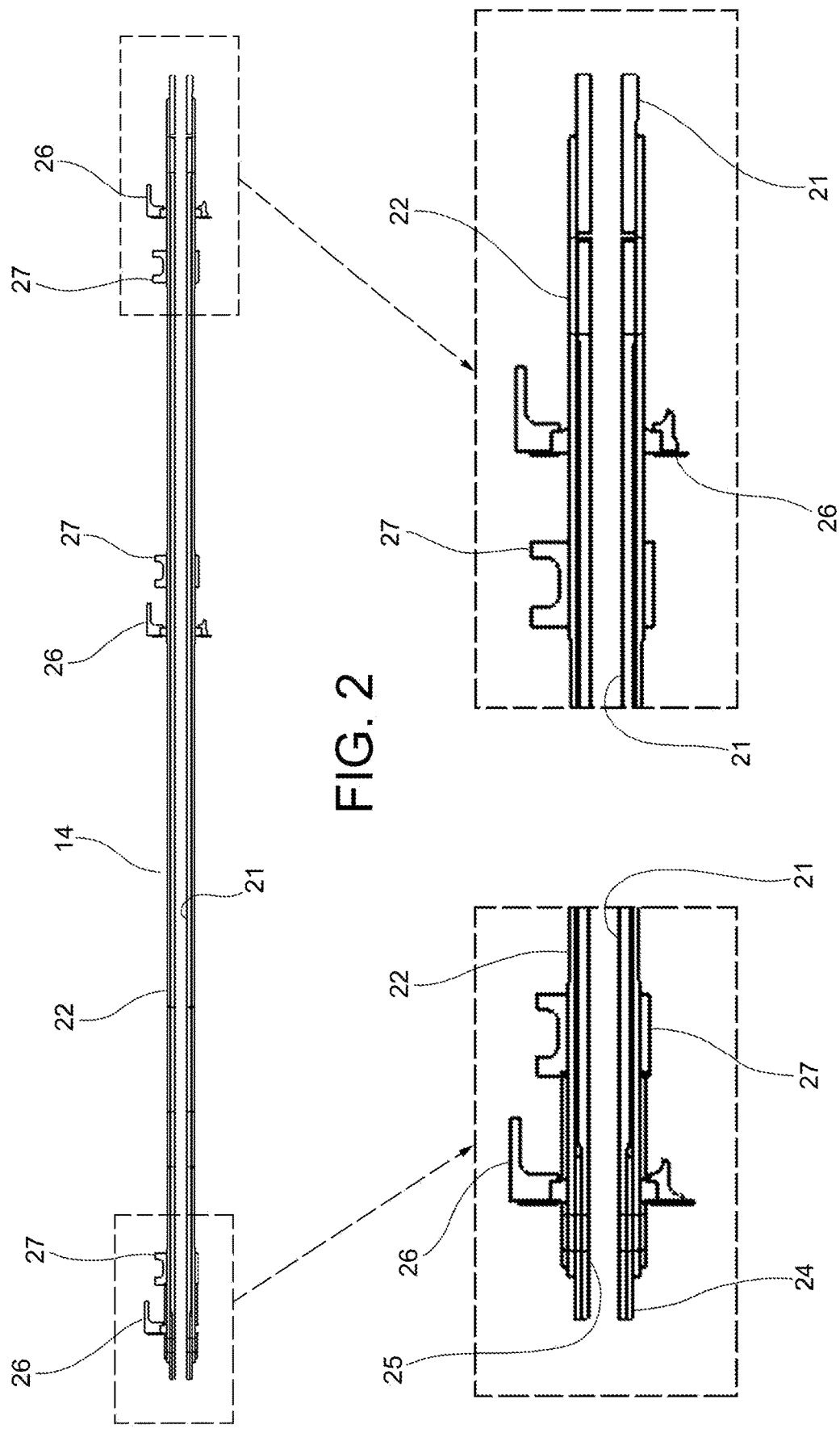
FIG. 2 is a side view of a double torsion shaft forming part of the mechanism of the cargo door of FIG. 1.

For constructive and assembly requirements, it is preferable to divide the torsion shaft into several segments joined together. The outer tubular control shaft 22 may therefore be composed of a plurality of tubular segments, in this example three in number, axially aligned and joined together, preferably in a removable way (for example by means of bolts 23, FIG. 3) and rigidly integral with the inner control shaft 21, so that the double torsion shaft 14 controlled by the control handle 16 transmits the movement to the actuation pins 19 and to the vent panel 11. The two shafts making up the torsion shaft 14 are preferably made of steel. Some bearings adapted to support rotatably the torsion shaft 14 on the cargo door are schematically indicated with 26, 27 (FIGS. 2, 2A, 2B).

For constructional and assembly reasons, the inner control shaft 21 may be composed of two joined steel tubes of adequate size which are inserted inside the outer tubular control shaft.

The tubes making up the inner control shaft 21, rigidly integral with the outer tubular control shaft 22, ensure the integrity of the locking system and, consequently, the transmission of motion from the control handle 16 to the actuation pins 19 and to the vent panel 11 also in the event in which the outer tubular control shaft has suffered a failure (for example due to corrosion, shock, or heat).

Operating on the control handle 16, the torsion shaft 14 transmits movement to the actuation pins 19 which lock the locking devices of the cargo door. The vent panel 11 is closed when the control handle 16 actuates the mechanism for locking the door, allowing the cabin to be pressurized, which remains hermetically sealed. In the event that the vent panel 11 remains open due to a failure in the drive system (for example due to breakage of the torsion shaft), pressurization may not take place because the "cut-out" hole (hermetically closed when the vent panel is closed) is not closed and discharges the air to the outside.

Figure 3:
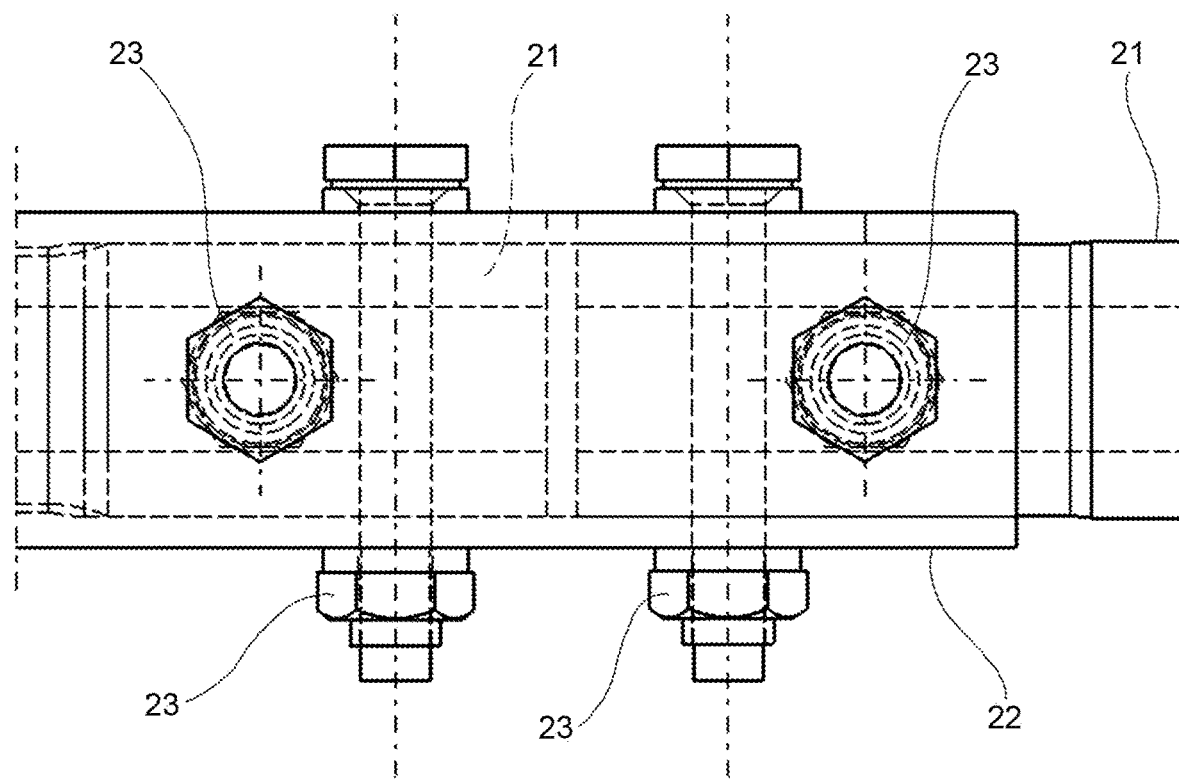
FIG. 3 is a detail on an enlarged scale, indicated with III in FIG. 2, of a joint between the two shafts, inner and outer, of the double torsion shaft.

Since current standards permit the failure of a single device of a plurality of locking devices 13, it is permissable that the torsion shaft 14 does not extend in its double shaft configuration along its entire length. As shown in FIGS. 1 and 3, a portion of the torsion shaft 14 may have only one of the two inner or outer control shafts. In the example shown herein, an intermediate portion of the torsion shaft 14 which actuates the third from the left of the locking devices 13, has only the inner control shaft 21 and has no outer tubular control shaft 22.

Preferably, the inner control shaft 21 or the segments composing the inner control shaft are joined to the outer tubular control shaft 22, and/or to the segments composing the outer tubular control shaft, only in proximity to the opposite ends of the inner control shaft or the relative segments.

To facilitate the assembly and possible disassembly of the torsion shaft 14 in the event of maintenance, and in particular to facilitate the insertion of the inner control shaft into the outer tubular control shaft, the inner control shaft 21 has a smaller outer diameter than the inner diameter of the outer tubular control shaft 22. In this way, the cylindrical surface of the main part of the inner shaft is not in contact with, and therefore does not rub against, the inner cavity of the outer tubular control shaft.

Figure 4:
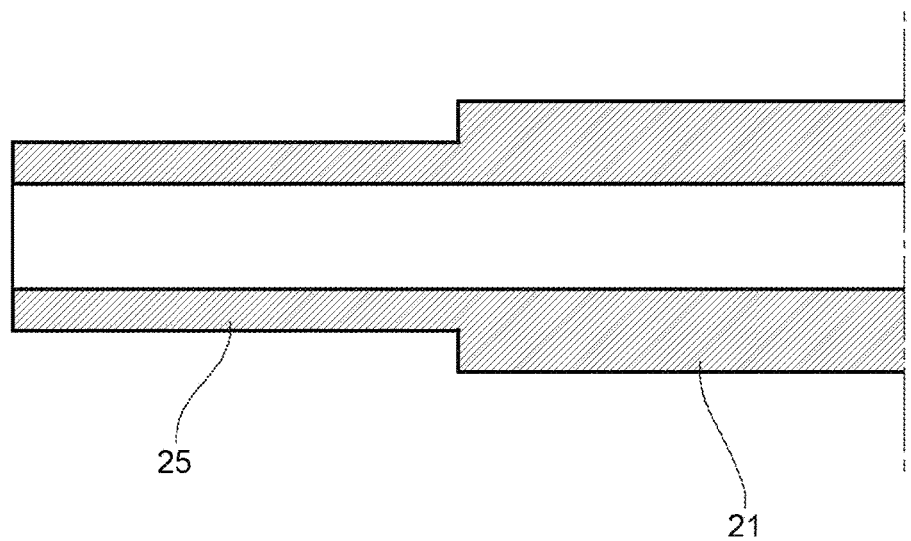
FIG. 4 is a schematic view of an end part of an inner shaft.

At the ends of the inner control shaft 21 or of each segment composing the inner control shaft, two centering bushings 24 may be mounted, each interposed between the inner cavity of the outer tubular control shaft 22 and one end of the inner control shaft 21 or a segment that composes it. The bushings 24 may be inserted on the ends 25 (FIG. 4) of the inner control shaft having smaller diameters or transverse dimensions than the outer diameter of the main part of the inner control shaft. The bushings 24 ensure the coaxiality of the inner and outer control shafts.

As may be appreciated, the outer tubular control shaft exerts a chemical, mechanical and thermal protective action with regard to the innermost shaft. The proposed solution ensures the functionality and monitoring of the cargo door lock system in all conditions including the occurrence of an individual fault.

The invention claimed is:

1. A cargo door for an aircraft, comprising:
a plurality of locking devices, spaced horizontally in proximity to a lower horizontal edge of the cargo door;
at least one vent panel arranged in the cargo door;
a manually operated control handle arranged on the cargo door;
a torsion shaft extending near said lower horizontal edge;
a plurality of actuation pins supported and rotationally driven by the torsion shaft to lock and unlock the plurality of locking devices;
a first drive connecting the control handle to the torsion shaft to rotate the torsion shaft following a locking or unlocking command given to the control handle;
a second drive connecting the torsion shaft to the at least one vent panel to open or close the at least one vent panel following a rotation of the torsion shaft;
wherein the torsion shaft is a double shaft comprising two coaxial and rotationally integral shafts, which comprise an inner control shaft and an outer tubular control shaft, wherein the inner control shaft has a smaller outer diameter than an inner diameter of the outer tubular control shaft, a predetermined transverse gap being provided between an outer surface of a main part of the inner control shaft and a part of an inner cavity of the outer tubular control shaft; and
wherein at opposite ends of the inner control shaft two respective centering bushings are mounted, each interposed between the inner cavity of the outer tubular control shaft and an end of the inner control shaft or of a segment composing the inner control shaft.

2. The cargo door of claim 1, wherein the centering bushings are inserted on ends of the inner control shaft having smaller diameters or transverse dimensions than the outer diameter of the main part of the inner control shaft.

3. The cargo door of claim 1, wherein the outer tubular control shaft comprises a plurality of tubular segments axially aligned and joined together.

4. The cargo door of claim 3, wherein the inner control shaft comprises a plurality of tubular segments axially aligned and joined together.

5. The cargo door of claim 4, wherein the inner control shaft or the tubular segments composing the inner control shaft are joined to the outer tubular control shaft and/or the tubular segments composing the outer tubular control shaft only in proximity to opposite ends of the inner control shaft or outer tubular control shaft or of relevant tubular segments.

6. The cargo door of claim 4, wherein the tubular segments composing the inner control shaft and/or the outer tubular control shaft are joined by removable connection means.

7. The cargo door of claim 6, wherein said removable connection means are bolts.

* * * * *